United States Patent
Pini

(10) Patent No.: US 8,684,657 B2
(45) Date of Patent: Apr. 1, 2014

(54) APPARATUS FOR THE TRANSFER OF A LINE END OF A FOLDER-GLUER

(75) Inventor: Giuseppe Pini, Senago (IT)

(73) Assignee: Revicart S.r.l., Paderno Dugnano (Milan) (IT)

( * ) Notice: Subject to any disclaimer, the term of this patent is extended or adjusted under 35 U.S.C. 154(b) by 354 days.

(21) Appl. No.: 13/154,052

(22) Filed: Jun. 6, 2011

(65) Prior Publication Data

US 2011/0297507 A1 Dec. 8, 2011

(30) Foreign Application Priority Data

Jun. 4, 2010 (IT) .............................. MI20100189 U

(51) Int. Cl.
*B65G 29/00* (2006.01)

(52) U.S. Cl.
USPC ........... 414/759; 414/774; 414/419; 198/406; 198/407; 198/408; 198/409

(58) Field of Classification Search
USPC ......... 198/312, 315, 402, 403, 404, 406, 407, 198/408, 409; 414/758, 759, 774, 779, 782, 414/419
See application file for complete search history.

(56) References Cited

U.S. PATENT DOCUMENTS

| | | | | |
|---|---|---|---|---|
| 763,307 A * | 6/1904 | Mills | ................................ | 72/231 |
| 2,865,516 A * | 12/1958 | Hedderich | ..................... | 414/765 |
| 3,089,598 A * | 5/1963 | Temple | ........................... | 414/758 |
| 3,540,609 A * | 11/1970 | Lefort | ............................. | 414/419 |
| 4,606,452 A * | 8/1986 | Lecrone | .......................... | 198/411 |
| 4,699,564 A * | 10/1987 | Cetrangolo | ..................... | 414/765 |
| 4,798,278 A * | 1/1989 | Cornacchia | .................... | 198/399 |
| 5,201,399 A * | 4/1993 | Dietrich | ......................... | 198/409 |
| 5,450,940 A * | 9/1995 | Rathert et al. | ................. | 198/412 |
| 5,979,634 A * | 11/1999 | Odegard et al. | ............... | 198/408 |
| 6,378,690 B1 * | 4/2002 | Pessina et al. | ................. | 198/414 |
| 6,527,100 B2 * | 3/2003 | Ballestrazzi et al. | ......... | 198/373 |
| 6,712,197 B2 * | 3/2004 | Kubota et al. | ................. | 198/620 |
| 6,793,454 B2 * | 9/2004 | Brizzi | ........................... | 414/767 |
| 6,851,920 B2 * | 2/2005 | Trautwein et al. | .......... | 414/798.4 |
| 6,966,553 B2 * | 11/2005 | Rathert | ........................ | 270/52.18 |
| 7,014,032 B2 * | 3/2006 | Franzaroli | ..................... | 198/399 |
| 7,040,479 B2 * | 5/2006 | Fochler et al. | ................ | 198/409 |
| 7,175,017 B2 * | 2/2007 | Carey et al. | .................... | 198/412 |
| 7,328,575 B2 * | 2/2008 | Hedman | .......................... | 60/407 |
| 7,513,287 B2 * | 4/2009 | Huber | ............................ | 156/580 |
| 7,607,882 B2 * | 10/2009 | Matalevich et al. | .......... | 414/789 |
| 8,181,767 B2 * | 5/2012 | Gales et al. | .................... | 198/404 |

\* cited by examiner

*Primary Examiner* — Douglas Hess
(74) *Attorney, Agent, or Firm* — Young & Thompson

(57) ABSTRACT

A transfer apparatus of a line end of a folder-gluer for cardboard boxes includes a transfer bed (1) with a double, opposite array of transmission belts (C1*a*, C1*b*, C2*a*, C2*b*) which define a transfer track for the displacement of flattened, folded boxes, wherein the transfer bed (1) is oscillatingly mounted about a horizontal axis (a-a') on a U-shaped support structure (21, 22, 24) which is in turn rotatingly mounted according to a vertical axis (b-b') on a base frame (26), the rotation according to the horizontal axis (a-a') and according to the vertical axis (b-b') occurring through a first (M1) and a second (M2 M2') motor, respectively.

15 Claims, 5 Drawing Sheets

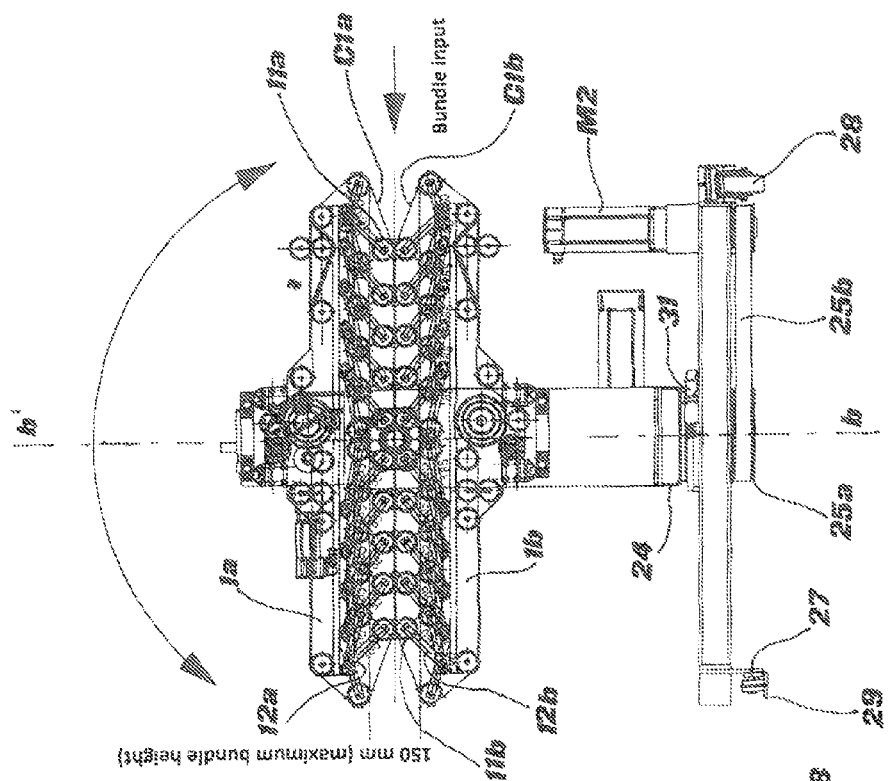
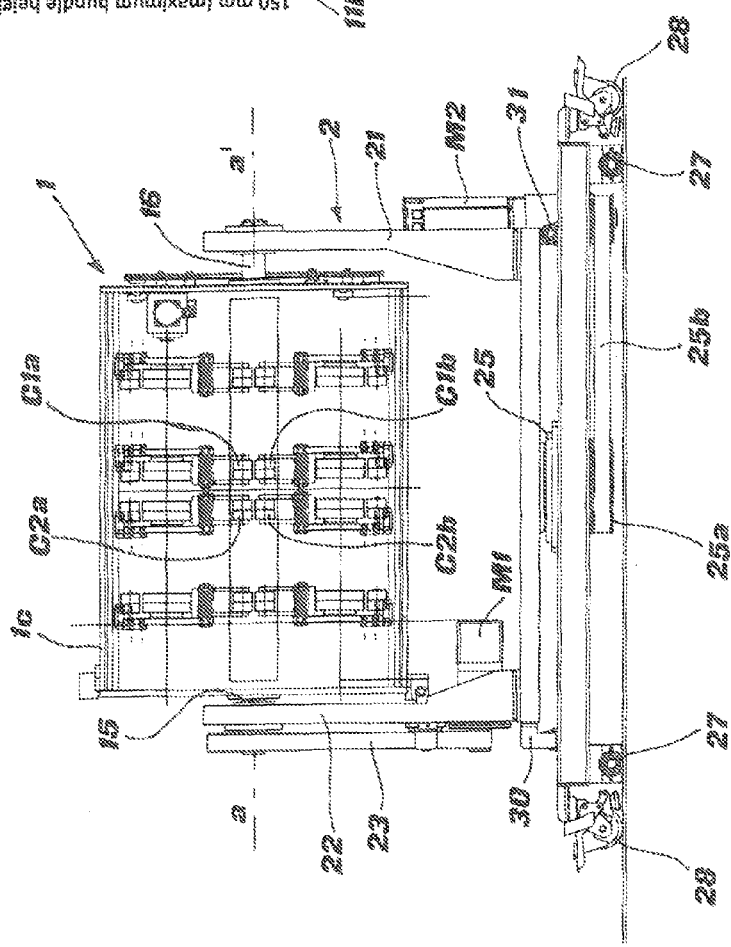

APPARATUS FOR THE TRANSFER OF A LINE END OF A FOLDER-GLUER

The present invention concerns a transfer apparatus for cardboard boxes produced by a folder-gluer, in particular a transfer apparatus to be employed in a line end.

As known, the production of cardboard boxes occurs starting from flat cardboard die cuts, obtained for example from a punch cutter, which are suitably folded and then glued on some flaps to build the desired container. The machine which carries out the folding and joining of some flaps of the die cuts is called folder-gluer. Some examples of folder-gluers are the models FUTURA™, FARO™ and TWINBOX® manufactured by the same Applicant.

The folder-gluer typically process a series of die cuts sequentially, one after the other, and expels them at the same rate at the end of the processing, in the shape of folded and flattened boxes.

The flattened boxes, at the end of the process of the folder-gluer, must then be piled in a certain number, for example 30 in each stack, to be able to stock and transport them easily. For such purpose, the flattened boxes are first conveyed on a presentation and counting machine, whereto they move partly lying one on top of the other, in a characteristic fish-scale-like configuration, so as to reduce the linear bulk of the plant and speed up packaging operations. A sample presentation and counting machine is the EASYPACK™ model manufactured by the same Applicant.

In substance, the flattened boxes translate in a fish-scale orientation on a transport line, whereon they are counted and then, in bundles of a certain number, transferred forward, pushing them into a line-end collection well where they are fully overlapping in a pile. From the collection well, one or more bundles of overlapping flattened boxes is transferred to a binding machine, for example a strapping apparatus which provides to tighten a strap ring around it.

A problem which must be faced in this final stacking part originates from the variability of the different types of boxes processed (for example American-type boxes, with automatic bottom, 4-corner ones, snap-engagement bottom, . . . ). As a matter of fact, each type of box, once built with the folder-gluer and flattened, has differentiated thicknesses, depending on the position of the folds and of the glued overlapping flaps. Typically, there is always a peripheral area where the flattened box is thicker or where one of the overlapping cardboard layers is missing. Sometimes, moreover, a single-layer cardboard portion (flabellum), intended for example to act as lid once the box is opened, sticks out from the main body of the flattened box.

This implies that there are also remarkable thickness differences in the object to be stacked.

In these conditions, if the flattened boxes were all simply stacked one on top of the other, the thickness difference would already with few specimens cause a wedge shape of the bundle which—as may be guessed—is totally unstable, nor is it efficient for space occupation.

There is hence also the need to stack in a differentiated manner the various flattened boxes, before sending them for binding and/or palletising.

This operation is traditionally performed by hand by an operator who, based on a preset set of instructions—defined for optimising the stacking of a specific type of box—rotates or flips upside down the half-bundles of flattened boxes, immediately below the presentation and counting machine, before transferring them directly to the binding machine.

Moreover, a device capable of flipping upside down a series of flattened objects moving in a fish-scale arrangement on a cylinder conveyor belt has already been on the market for some time. This device is capable of gripping a whole group of flattened boxes in a fish-scale arrangement, and flipping it upside down by 180° about a horizontal axis transversal to the movement direction of the transport line.

However, this device is not sufficient for meeting all the requirements occurring on an end line of a folder-gluer. There derives that it remains essential the presence of an operator, for providing also to the rotation of the boxes on the plane thereof and for providing a certain alternation of differently arranged groups of boxes, thereby forming a pile suitable to be then subjected to strapping.

In this respect it must be noticed that the rotation of the flattened boxes on the plane thereof is an operation which is still of remarkable importance, despite the existence of the opportunity for an automatic upside down flipping about a horizontal axis. As a matter of fact, the rotation on the (normally horizontal) plane guarantees a greater positioning variability and allows to manage potentially better also the boxes of corrugated cardboard. As a matter of fact, although the processing which a box die cut undergoes are the same, be it solid cardboard or corrugated cardboard, the latter is tendentially more sensitive with respect to the packaging direction of the strapping apparatus.

Moreover, the known flipping over device is configured to process a series of boxes in a fish-scale orientation, so as to always process a substantially even thickness of boxes. However, this implies a significant length of the conveyor belt and hence generates remarkable inertia forces during the movements, which necessarily force to limit operation speed.

The object of the present invention is hence of providing an end-line apparatus for a folder-gluer which allows to orient as desired bundles of flattened boxes, before presenting them to a collection well wherefrom they are taken for subsequent packaging. A further object is to provide such a machine which has a reduced bulk and hence reduced inertia moments which allow rotary operation even at high speeds.

This object is achieved through an apparatus having the features mentioned in claim 1.

The dependent claims disclose preferred features of the invention.

In particular, according to a first aspect, a transfer apparatus is supplied for a line-end of a folder-gluer for cardboard boxes, of the type comprising a transfer bed with a double opposite array of transmission belts which define a transfer track for the movement of flattened, folded boxes, wherein the transfer bed is mounted oscillating about a horizontal axis on a U-shaped support structure which is in turn rotatably mounted along a vertical axis on a base frame, the rotation along the horizontal axis and along the vertical axis occurring through a first and a second motor, respectively.

According to another aspect, the U-shaped support structure is rotatably mounted through a thrust-block bearing is integral in rotation with a drive shaft which runs through the base frame and is suitably driven by motorisation means; said means may consist of a drive pulley engaged with a transmission belt housed below the base frame and connected with the respective second motor mounted on the base frame.

According to a further aspect, the apparatus provides braking means at least between the U-shaped structure and the base frame, to decelerate the rotation of the U-shaped structure about the vertical rotation axis. The braking means are preferably in the shape of a dissipating dampener.

According to another preferred aspect, the base frame of the apparatus rests on the floor through movement members which comprise at least a pair of wheels translatable on a rail which may be fastened to the ground. The rail is preferably arranged orthogonally to a movement direction of the transfer track and also possibly orthogonal to a main direction along which a deceleration load of the rotation of the transfer bed acts.

According to a last peculiar aspect, the double array of opposite belts is adjustable in position both in a direction transversal to the transfer track, and in the direction of the relative distance of said belts.

Further features and advantages of the invention are in any case more evident from the following detailed description, given purely as a non-limiting example and illustrated in the attached drawings, wherein:

FIG. 1A is a more schematic view, similar to the one of FIG. 1, which shows two positions taken up by a transfer bed according to the invention;

FIG. 2A is a similar more schematic, but inverted, view of FIG. 2, which shows two positions taken up by a transfer bed according to the invention;

Figure 1:
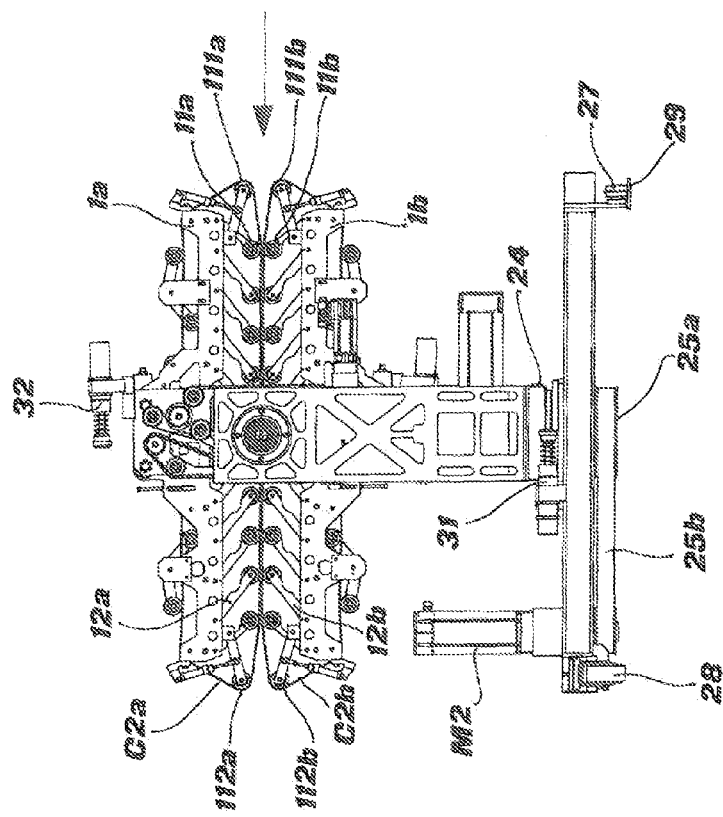
FIG. 1 is a front elevation view of the apparatus according to the invention.

As visible in FIG. 1, a transfer apparatus for a line end of a folder-gluer consists of a transfer bed 1 supported at a certain height by a support frame 2.

Transfer bed 1 defines a translation plane, wherein a series of flattened boxes is intended to transit. The translation plane is kept at the desired height, i.e. aligned with an entry plane of the flattened boxes, substantially coinciding with an exit plane from a presentation and counting machine. For such purpose, frame 2 is suitably sized in height, or has adjustment means of the height at which it supports transfer bed 1.

Transfer bed 1 consists of a pair of transfer assemblies 1a and 1b, a lower one and an upper one, facing each other sandwich-like. The active part of each transfer assembly is or 1b consists of a pair of drive belts C1 and C2, mounted mutually movable closer together or further apart in a crosswise direction, so as to adapt to the width of the boxes to be processed (for example up to a maximum width of 1200 mm). FIG. 1 shows the extreme position, transversally closer together, of the two pairs of belts, while FIG. 1A shows the same pairs of belts also in the extreme positions, transversally mutually far away.

Between the two pairs of opposite upper belts C1a, C2a and lower belts C1b, C2b a translation track is defined, within which a group or half-bundle of flattened boxes is intended to run, in the number defined by a presentation and counting machine which precedes above.

The belts are aligned along the transfer direction (i.e. the one shown by the arrow in FIG. 2) and allow to drag into the same direction the half-bundle of flattened boxes, from the entry of the device (right hand side of FIG. 2) up to an exit side (left hand side in FIG. 2), wherefrom the boxes are sent to a collection well.

Belts C1 and C2 are guided and driven into movement by a plurality of cylinders 11 mounted at the end of oscillating connecting rods 12, hinged at the bottom of transfer assemblies 1a and 1b. Connecting rods 12 are mounted elastically oscillating, in a way known per se, to follow the thickness variation of the box assembly when it runs through the upper and lower belts.

Figure 2:
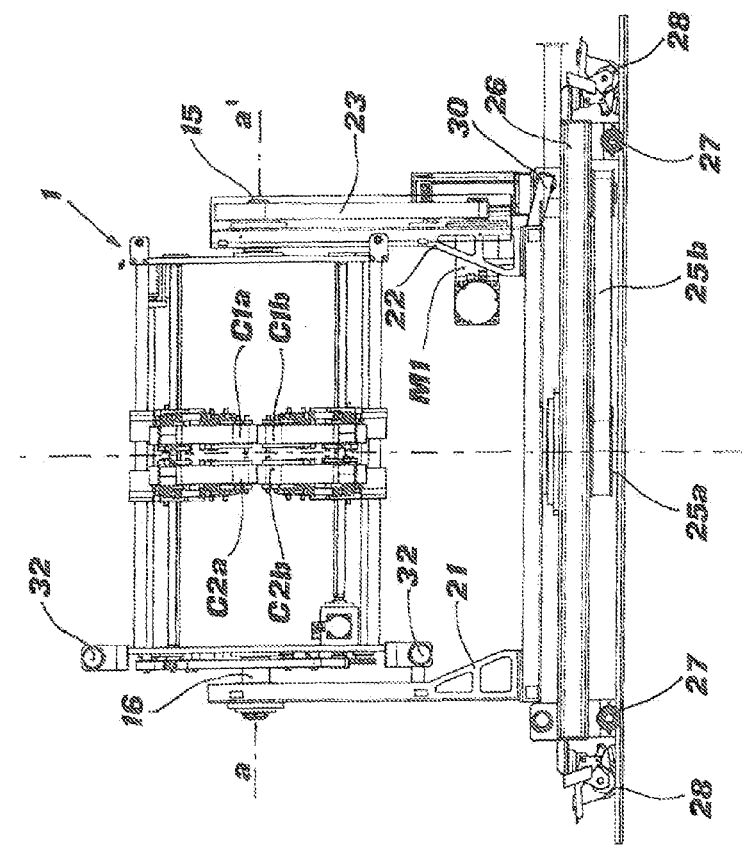
FIG. 2 is a side elevation view of the apparatus taken from the left of FIG. 1.

The two transfer assemblies 1a and 1b are mounted at a fixed mutual distance, but connecting rods 12 are mounted adjustable in their oscillation, so as to arrange respective cylinders 11 at larger or smaller distance from the median translation plane. In other words, the relative distance between the upper belts and the lower belts may be adjusted. Thereby, the sliding track may be widened or reduced in height, housing bundles of boxes of different heights, for example up to 150 mm. FIG. 2 shows the two belts almost touching each other, while FIG. 2A shows the two extreme positions which the arrays of cylinders 11 may take up.

In order to achieve one of the objects of the invention, the transfer apparatus is preferably intended for installation below a presentation and counting machine, wherefrom half-bundles of already stacked boxes come out (for example between 6 and 12 stacked boxes). Transfer bed 1 may hence be built with a reduced length, with respect to what would be required if it was to process the same number of boxes in a fish-scale orientation. In order to achieve such result, the pair of transmission belts must be capable of housing half-bundles having a significant variability of thicknesses between one another, depending on the number and type of box. For such purpose, in the entry and exit area of the cylinder assembly 11a and 11b additional entry cylinders 111 ad exit cylinders 112 are provided, whereon belts C1 and C2 run. Entry cylinders 111 and exit cylinders 112 are driven in position by corresponding pneumatic cylinders, which move them closer together or further apart according to a preset sequence. Thereby, it is possible to control—at each introduction and expulsion cycle—the opening and closing back of the entry (through displacement of entry cylinders 111) to allow the introduction of the half-bundle of boxes, as well as the opening and closing back of the exit (through displacement of exit cylinders 112) to create a sort of expulsion thrust of the half-bundle.

Transfer bed 1 is rotatably mounted on frame 2 along a horizontal axis a-a', transversal to the progress direction of the sliding track. For such purpose, transfer bed 1 is installed on a rigid annular structure 1c, arranged transversally to the sliding track, with which two coaxial support shafts 15 and 16 are integral. These two support shafts 15 and 16, which define the rotation axis a-a' of transfer bed 1, are furthermore supported on corresponding bearings at the upper ends of a pair of posts 21 and 22 of frame 2.

With one 15 of the two support shafts a pulley is made integral, with which a transmission belt 23 engages. Said belt comes down as far as the base of the respective post 22, where it engages with a pulley of a first actuation motor M1, hence suited to drive the rotation of transfer bed 1 about flipping over axis a-a'.

The rotation of bed 1 about horizontal axis a-a' may be carried out through angles of ±180°. Due to the limited longitudinal dimensions (i.e. in the direction of progress of the half-bundles), the rotation along the horizontal axis does not generated excessive inertia forces and the height from the ground of axis a-a' remains at acceptable levels which are compatible with the height of the operators.

According to the invention, moreover, the two posts 21 and 22, whereon the flipping over of transfer bed 1 occurs, are in turn fastened to a horizontal support beam 24, which is rotatably mounted in the plane thereof, i.e. about a vertical axis b-b'. The assembly of posts 21 and 22 and of beam 24 makes up a U-shaped structure within which transfer bed 1 is oscillatingly mounted.

Figure 3:
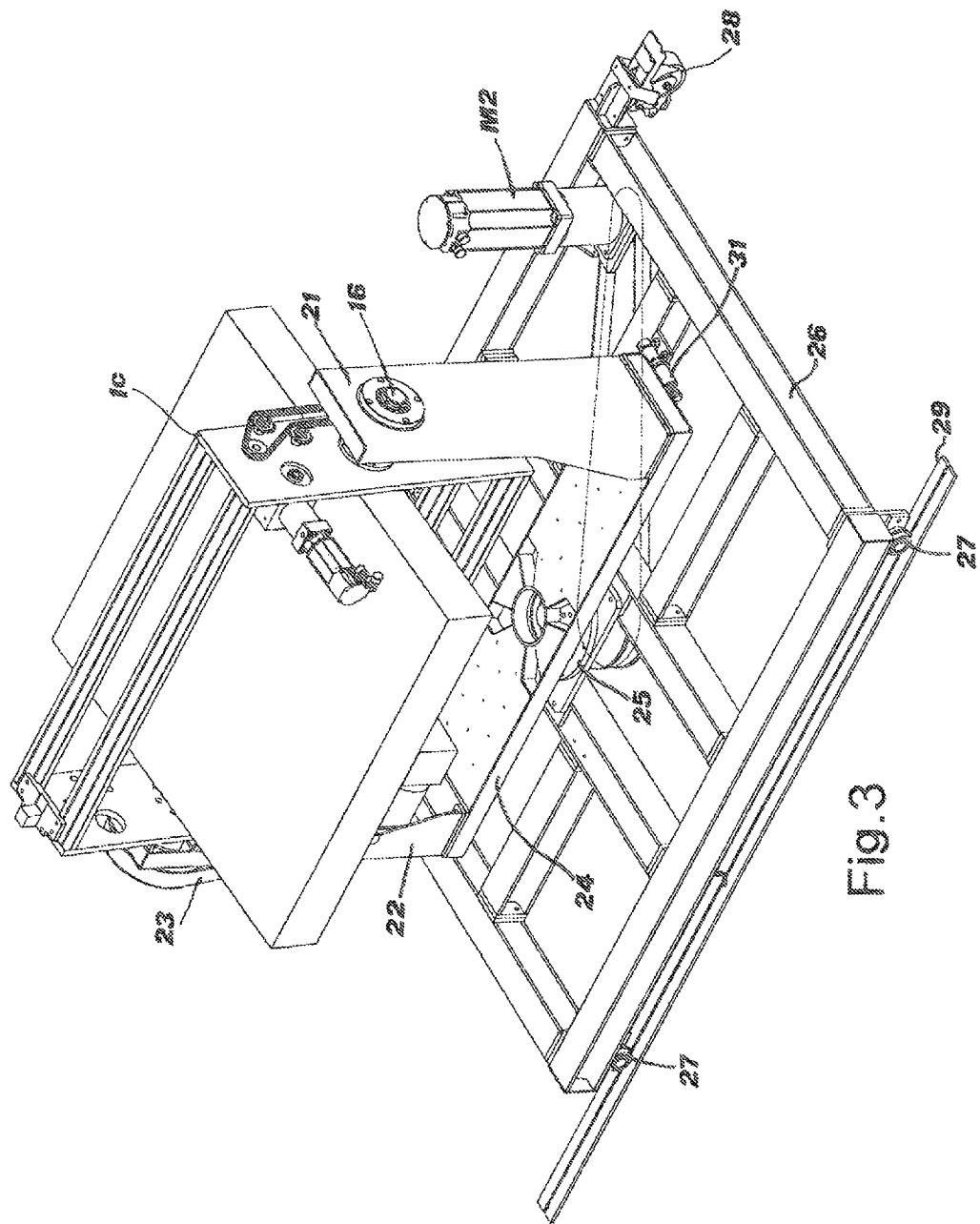
FIG. 3 is a schematic, top-plan, perspective view of the apparatus of FIG. 1.
Figure 4:
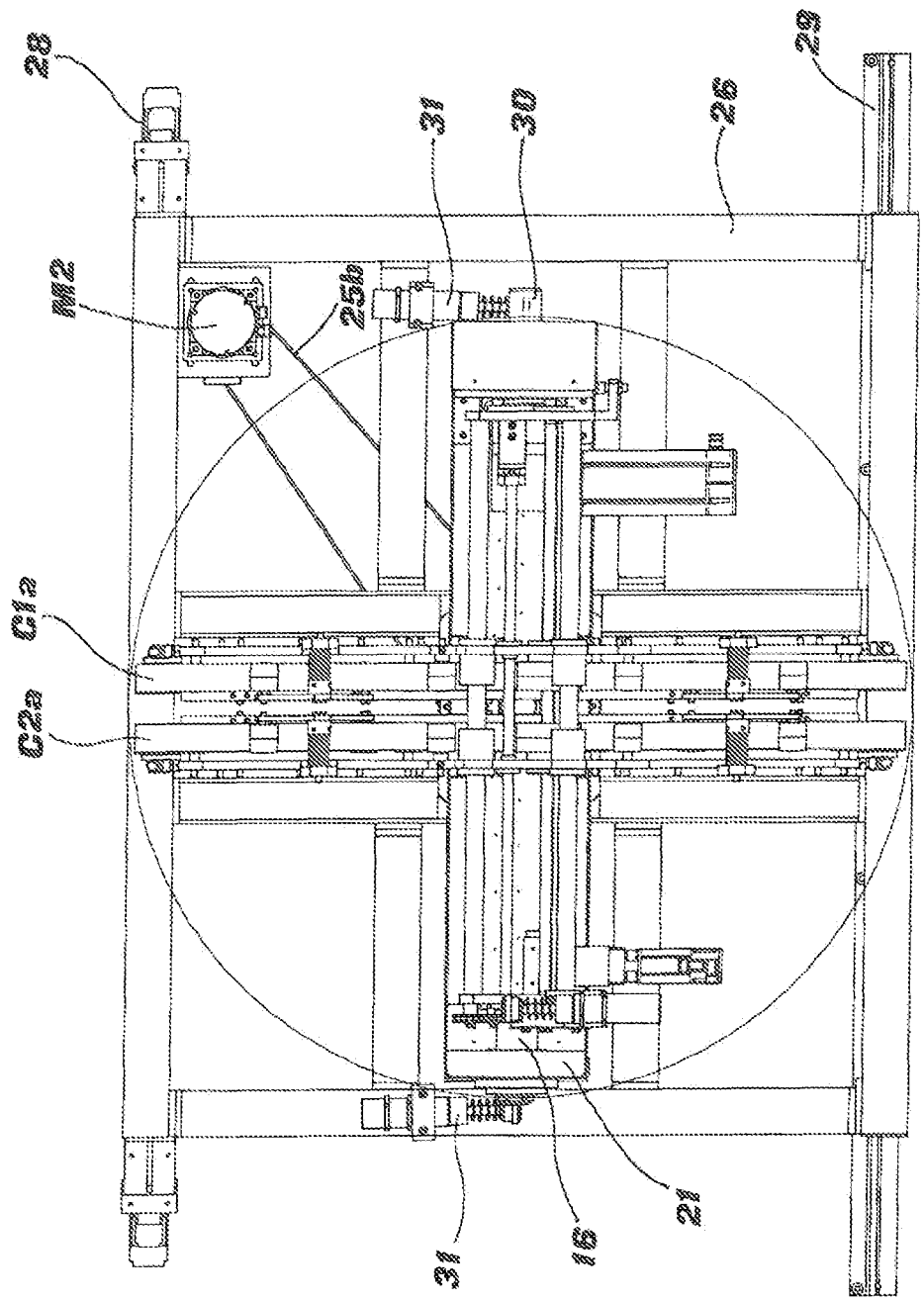
FIG. 4 is a top-plan view of the apparatus of FIG. 1.

As clearly visible in FIGS. 2 and 3, beam 24 is installed on a thrust-block bearing 25 integral with a base frame 26.

According to a first embodiment, a drive shaft integral with beam 24 and running through 25, carries at the lower end thereof a drive pulley 25a, which receives motion from a second drive belt 25b, driven into motion by a second motor M2 fastened to base frame 26. Preferably, as visible in FIGS. 1 and 2, pulley 25a and belt 25b are housed below base frame 26.

Motor M2 causes beam 24- and therefore the whole transfer bed 1 mounted on U-shaped support structure—to perform rotations by a preset angle about vertical axis b-b', in one direction and in the opposite one, depending on plant requirements and layout, for example ±180° or ±90°.

In order to be able to obtain fast rotations of the apparatus about the vertical axis, despite the inertia of the masses, the motor is preferably assisted by braking means or travel-end means of beam 24. For example, below beam 24—at one end thereof—a small, fixed abutment bracket 30 is provided, intended to abut with dissipating dampeners 31, fastened to underlying base frame 26, when the two travel-end positions of the rotation are reached, for example at +180° and −180°. The acceleration phase in rotation may hence be managed effectively with the power of motor M2, while in the deceleration phase the electric control on the motor is more effectively assisted by the braking means, thereby overall reducing the rotation times of transfer bed 1.

Figure 5:
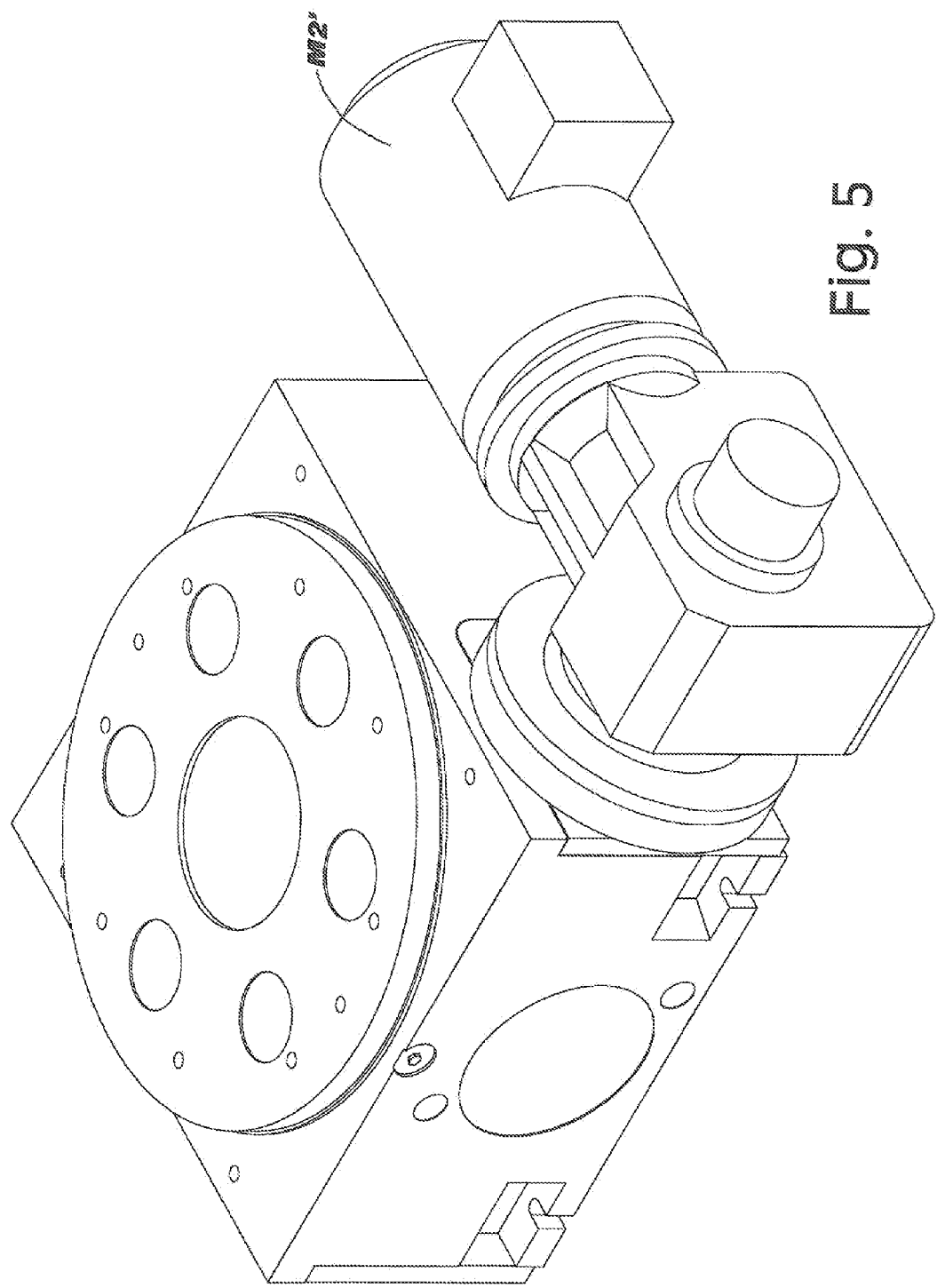
FIG. 5 is a perspective view of alternative motorisation means for the rotation about the vertical axis.

According to a preferred alternative embodiment, the beam 24 of the U-shaped frame is constrained to an intermittently rotating plank, actuated by an asynchronous motor driven by a suitable actuation system to obtain the desired speed variations. FIG. 5 shows an exemplifying embodiment of the rotating plank, provided with an actuation motor M2' (for example a three-phase, asynchronous electric motor, piloted through an inverter).

Motor M2' actuates in rotation a horizontal cylinder, provided with a plurality of cam-shaped grooves, with which cylinders integral with the plank engage, arranged circumferentially with axis parallel to the rotation axis of the plank: due to this configuration the mechanical plays are extremely reduced and the rotation inertia is absorbed by the cylinders.

Thereby, no operation irregularities arise (elastic rebounds) typical of the actuation with toothed belts; moreover, since the plank is lubricated with oil, as well as being suitably sized, the rotation system maintains over time its features of precision and sturdiness and does not require special maintenance.

Frame 26 is furthermore provided with displacement members, for example wheels 27 and 28, which allow the translation thereof onto the plane of a floor. Preferably, at least a pair of wheels 27 are suited to slide on a rail 29 securely fastened to the floor; the other pair of wheels 28 is provided with braking means, to prevent free displacement. The displacement allowed to base frame 26 (and consequently of the entire apparatus) from rail 29 is hence only in one direction, typically the direction transversal to the progress direction of the boxes along the transport line. This contraint allows to perform transversal position adjustments of the apparatus—which are useful when the format of the boxes varies, in order to be able to centre the transfer track with respect to the flattened boxes—but it prevents undesired displacements of the apparatus, caused by the significant inertia forces which are generated with the rotation of transport bed 1 about axis b-b'. In such respect, braking means 31 are preferably oriented so as to release the deceleration forces on frame 26 in a way orthogonal to rail 29: in substance, the braking forces which are released on dampeners 31, during the rotations stop phase, crosswise to the rail and are hence unable to produce any significant apparatus displacement work.

The configuration set forth above hence allows to transfer a group of flattened boxes (half-bundle) from one entry area to an exit area, determining—depending on cases—both the flipping over about horizontal axis a-a', and the rotation on the plane about vertical axis b-b'. The two motors M1 and M2 (or M2') may be controlled independently, so as to possibly mutually combine the two rotations and hence save on transfer times.

The apparatus according to the invention, inserted between a folder-gluer and a collection well of the bundles of flattened boxes, allows to achieve the necessary transfer flexibility, which makes the entire process fully automatic, up to the binding of the bundles. The main purpose set forth in the premises is hence fully achieved. In case exclusively half-bundles of boxes are processed, with the cylinder displacement device in the transfer bed, it is also possible to limit the bulk of the apparatus and hence dramatically reduce the inertia masses, to the advantage of operation speed and productivity.

As an example, the whole box processing procedure may be described as in the following, with reference to specific measurements and types which are not to be understood in a limiting sense.

A series of planar cut dies, of corrugated or solid cardboard, are introduced into a folder-gluer. At the exit of such machine, the flattened boxes undergo a quality check, where they are possibly discarded before being counted and presented to the binding machine.

Below the quality check a collector is arranged, with a section for counting and presenting the bundle of boxes, for example an EASYPACK™ apparatus, suitable to be installed at the end of the exit section of any type of folder-gluer, for example for twinbox boxes, B-1 boxes, 4-angle and automatic-bottom boxes with overlapping fish-scale orientation.

The boxes arrive in a fish scale arrangement and are counted through a laser sensor. As an alternative a mechanical counter can be used. The forming of the bundle or half-bundle of flattened boxes occurs through expulsion by pushers, in combination with a system for the support of the scales arrangement, without ever arresting the progress of the boxes coming from the exit section of the folder-gluer. The collector operates with any kind of box: in the case of boxes with an irregular rear side (as automatic bottom with cover), the pushers may be offset, for example up to 500 mm.

In order to maintain bundle stability during expulsion, an adjustable upper lamina may be provided, in addition to two front stops, which ensure the perfect squaring of the bundle and which act automatically depending on box height.

Exemplifying sizes of boxes which may be processed are minimum 200×150 mm and maximum 1500×1200 mm. The bundles are formed at a certain rate, for example maximum one bundle every 3 seconds. Therefore, for example, with a 5-box bundle 6,000 boxes are processed in an hour, with a 10-box bundle a rate of 12,000 boxes/hour is obtained, and so on.

At the exit of the collector the transfer apparatus according to the invention is arranged, which then precedes the transfer into the collection well. The partial bundles, counted and pushed by the collector, are gripped in the entry section by the belt sandwich and transferred entirely into transfer bed 1. Here the partial bundle is arrested and then it possibly undergoes one or more rotations according to the flipping over axis and the rotation axis on the plane. Thereby 4 possible operations are determined:

gripping of the half-bundle and leading into the well as the half-bundle has been received;

gripping of the half-bundle, flipping over by 180° on the horizontal axis in the movement direction and deposit in the well;

gripping of the half-bundle, rotation with respect to the vertical axis and deposit in the well;

gripping of the half-bundle, rotation by 180° on the vertical axis and at the same time in a horizontal axis and deposit in the well.

The belt sandwich may house a half-bundle as tall as 150 mm.

The motorised belts may first move automatically, to position themselves laterally depending on the box width.

Work cycles are with the same cyclicity as the preceding collector, for example an action every 3 seconds, while the work sequence (of the four ones indicated above) is chosen according to the type of box.

The well receives the partial bundles and then, through the lateral pusher and upper pressing element, it leads the completed bundle as far as a binding machine, for example a bow strapping apparatus, provided with front stop.

The binding machine, working in line or at 90°, can bind either transversally or in the direction of movement, performing one or more bindings. Similarly, depending on specific requirements or specific box designs, the rotation on vertical axis b-b' may occur even at 90°.

After which the bundle is expelled onto a belt arranged longitudinally to the direction of movement, to deposit it onto an idle roller unit which acts as an accumulation lung for palletisation.

However, it is understood that the invention is not limited to the specific configurations illustrated above, which represent only non-limiting examples of the scope of the invention, but that a number of variants are possible, all within the reach of a person skilled in the field, without departing from the scope of the invention.

In particular, posts 21 and 22 and beam 24, which form a generically U-shaped support structure, may take up also other specific shapes. For example, beam 24 may also be in the shape of a circular platform.

Again, although it has not been specifically described, the braking system to the vertical rotation of transfer bed 1, employed between beam 24 and frame 26, may be employed in a similar way also on the upside down rotation about the horizontal axis, as synthetically shown in FIGS. 1 and 2 by dampener devices 32.

Again, the braking means are substantially essential in the presence of a transmission with strong plays (such as a toothed belt transmission), while it could also be done without in case the rotating plank with integrated motor M2' is employed.

The invention claimed is:

1. A transfer apparatus for a line end of a folder-gluer for cardboard boxes, comprising:
    a first motor (M1);
    a second motor (M2, M2');
    a base frame (26);
    a U-shaped support structure (21, 22, 24) rotatingly mounted according to a vertical axis (b-b') on the base frame (26); and
    a transfer bed (1) with a double, opposite array of transmission belts (C1a, C1b, C2a, C2b) which define a transfer track for displacement of flattened folded boxes, wherein said transfer bed (1) is oscillatingly mounted about a horizontal axis (a-a') on the U-shaped support structure (21, 22, 24) which is in turn rotatingly mounted according to the vertical axis (b-b') on a base frame (26), the rotation according to the horizontal axis (a-a') and according to the vertical axis (b-b') occurring through the first motor (M1) and the second motor (M2, M2'), respectively.

2. The apparatus as claimed in claim 1, wherein said U-shaped support structure (21, 22, 24) is rotatingly mounted through a bearing (25) and is integral in rotation with a drive means motorised by said second motor (M2, M2').

3. The apparatus as claimed in claim 2, wherein said drive means comprises a drive shaft which runs through said base frame (26) ending below with a driving pulley (25a).

4. The apparatus as claimed in claim 3, wherein said driving pulley (25a) is engaged with a transmission belt (25b) housed below the base frame (26) and connected with said second motor (M2) mounted on said base frame (26).

5. The apparatus as claimed in claim 1, wherein braking means (30, 31) are provided at least between said U-shaped structure (21, 22, 24) and said base frame (26) for decelerating the rotation of the U-shaped structure about the vertical axis (b-b').

6. The apparatus as claimed in claim 5, wherein said braking means are shaped as a dissipating dampener (31).

7. The apparatus as claimed in claim 1, wherein said base frame (26) rests on a floor through displacement members (27, 28, 29).

8. The apparatus as claimed in claim 7, wherein said displacement members comprise at least one pair of wheels (27) translatable on a rail (29) which may be fastened to the floor.

9. The apparatus as claimed in claim 8, wherein said rail (29) is arranged orthogonally to a direction of movement of said transfer track.

10. The apparatus as claimed in claim 8, wherein said rail (29) is orthogonal to a main direction along which a deceleration load of the rotation of said transfer bed (1) acts.

11. The apparatus as claimed in claim 1, wherein said U-shaped support structure comprises two lateral posts (21, 22) at upper ends of which rotation bearings are provided with which support shafts (15, 16) of said transfer bed (1) engage which define said horizontal axis (a-a').

12. The apparatus as claimed in claim 11, wherein one of said support shafts (15) is integral with a pulley engaged with a transmission belt (23) connected to said first motor (M1) integral with the U-shaped structure (22).

13. The apparatus as claimed in claim 1, wherein said double array of opposite belts (C1a, C1b, C2a, C2b) is adjustable in position both in a crosswise direction to the transfer track, and in the direction of the relative distance thereof.

14. Apparatus The apparatus as claimed in claim 13, wherein said belts (C1, C2) are guided by a plurality of cylinders which may be adapted in position.

15. The apparatus as claimed in claim 13, wherein there are provided at least input cylinders (111) and output cylinders (112) driven in position to cyclically determine an opening in height of an input section and of an output section of said double array of opposite belts (C1, C2).

* * * * *